US012080955B2

(12) United States Patent
Champion et al.

(10) Patent No.: US 12,080,955 B2
(45) Date of Patent: Sep. 3, 2024

(54) WIDEBAND WIRE ANTENNA

(71) Applicants: THALES, Courbevoie France (FR); UNIVERSITE DE BRETAGNE OCCIDENTALE, Brest (FR); Centre national de la recherche scientifique, Paris (FR)

(72) Inventors: Jefferson Champion, Brest (FR); Stéphane Mallegol, Brest (FR); Ismaël Pele, Brest (FR); Erwan Goron, Brest (FR); Jessica Benedicto, Brest (FR); Noham Guy Philippe Martin, Brest (FR); Rozenn Allanic, Brest (FR); Cédric Quendo, Brest (FR)

(73) Assignees: THALES, Courbevoie (FR); UNIVERSITE DE BRETAGNE OCCIDENTALE, Brest (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 18/084,398

(22) Filed: Dec. 19, 2022

(65) Prior Publication Data

US 2023/0198157 A1 Jun. 22, 2023

(30) Foreign Application Priority Data

Dec. 21, 2021 (FR) ..................................... 21 14098

(51) Int. Cl.
*H01Q 5/25* (2015.01)
*H01Q 9/27* (2006.01)

(52) U.S. Cl.
CPC ................. *H01Q 5/25* (2015.01); *H01Q 9/27* (2013.01)

(58) Field of Classification Search
CPC ............... H01Q 1/38; H01Q 5/25; H01Q 9/27
See application file for complete search history.

(56) References Cited

U.S. PATENT DOCUMENTS 5,563,616 A * 10/1996 Dempsey ............... H01Q 9/285 343/756
6,075,485 A * 6/2000 Lilly .................... H01Q 9/0407 343/895

(Continued)

FOREIGN PATENT DOCUMENTS

CN 207183522 4/2018
FR 3 003 702 9/2014
FR 3003701 A1 * 9/2014 ............... H01Q 1/38

OTHER PUBLICATIONS

Search Report for FR2114098, dated Aug. 17, 2022, 2 pages.

*Primary Examiner* — Dameon E Levi
*Assistant Examiner* — Leah Rosenberg
(74) *Attorney, Agent, or Firm* — NIXON & VANDERHYE

(57) ABSTRACT

The disclosed antenna includes: a radiating element disposed in a radiating plane transverse to an axis of the antenna; a reflecting plane, which is transverse to the axis, the radiating plane being located at a predetermined height above the reflecting plane; and a substrate, interposed between the radiating plane and the reflecting plane, and having a constant thickness. This antenna is characterized by a local relative electrical permittivity of the substrate that is a function of the radius, i.e. the distance to the axis, and a height, i.e. a distance to the reflecting plane, the local relative electrical permittivity being, at constant height, increasing as a function of the radius, and, at constant radius, increasing as a function of the height at least for a portion of the substrate in the vicinity of the reflecting plane.

20 Claims, 5 Drawing Sheets

(56) References Cited

U.S. PATENT DOCUMENTS

| | | | | |
|---|---|---|---|---|
| 6,137,453 | A | 10/2000 | Wang et al. | |
| 8,164,542 | B2 * | 4/2012 | Chantalat | H01Q 15/0073 343/909 |
| 8,847,846 | B1 * | 9/2014 | Diaz | H01Q 9/27 343/895 |
| 2003/0020655 | A1 * | 1/2003 | McKinzie, III | H01Q 1/38 343/909 |
| 2013/0249762 | A1 * | 9/2013 | Grelier | H01Q 19/10 343/912 |
| 2020/0044356 | A1 * | 2/2020 | Mallegol | H01Q 17/00 |
| 2021/0126374 | A1 * | 4/2021 | Mallegol | H01Q 11/105 |
| 2022/0352639 | A1 * | 11/2022 | Abushakra | H01Q 13/06 |

* cited by examiner

WIDEBAND WIRE ANTENNA

This application claims the priority under 35 U.S.C. 119 of French application FR 21 14098, filed Dec. 21, 2021, the entirety of which is incorporated herein by reference.

BACKGROUND OF THE INVENTION

Field of the Invention

The present invention is concerned with wideband wire antennas.

Description of the Related Art

In an electromagnetic listening system, for example an airborne one, the antennas, which are used either individually or in a goniometric or interferometric array, must operate in a very wide frequency band and in a circular, linear or dual linear polarisation, as neither the frequency nor the polarisation of the signal to be picked up is known a priori. It should be noted that since the characteristics of an antenna are the same for receiving and emitting, an antenna can be characterised both for emitting and receiving. In the following, the emitting behaviour is presented more frequently.

These antennas should be as small as possible and, in particular, as thin as possible. They must also have radiation performance (gain, pattern quality, etc.) that is reproducible from one antenna to another, for networked applications or to facilitate replacement during maintenance.

In this context, it is known to use wire antennas. In such an antenna, the radiating element consists of a metal wire which is shaped to describe, in a so-called radiating plane, a spiral-shaped pattern for a spiral antenna, or a log-periodic shape for a log-periodic antenna, or a hybrid of these two geometries for a sinuous antenna (as defined for example in the article by Crocker D. A. et al. "Sinuous Antenna Design for UWB Radar>>2019 IEEE International Symposium on Antennas and Propagation and USNC-URSI Radio Science Meeting, DOI: 10.1109/APUSNCURSINRSM.2019.8888630).

For a spiral type antenna, the metal wire is wound on itself so that it forms a spiral when viewed from above. This spiral can be, for example, an Archimedean spiral, a logarithmic spiral, or other. Alternatively, several metal wires can be used to form as many interlocking spirals.

In a log-periodic antenna, the metal wire is shaped so that it has several segments when viewed from above. Each segment is inscribed within an angular sector, extends radially, and has indentations. The length of each tooth and the distance between two successive teeth in a segment follow a logarithmic progression.

In the following we will refer to a strand of the radiating element, whether it is a turn of the metal wire of a spiral antenna or a tooth of a segment of a log-periodic antenna.

In practice, in planar technology, the radiating element is made by etching a thin metal layer, for example a copper layer between 2 and 40 μm, for example equal to 17.5 μm or 35 μm, deposited on a thin support film.

In a known technology, the radiating plane is located above a metal reflecting plane. In such an antenna, the wave emitted by the radiating element to the rear of the radiating plane is reflected forward by the reflecting plane. During this reflection, the wave is out of phase by an angle $\pi$. The reflected wave propagates forward and interferes, beyond the radiating plane, with the wave emitted by the radiating element forward of the radiating plane. This interference is constructive when, for a given wavefront position, the phases of the forward-emitted and forward-reflected waves are close. This occurs if the distance between the radiating plane and the reflecting plane is close to $\lambda/4$, where $\lambda$ is the wavelength in the dielectric medium between the radiating plane and the reflecting plane of the wave emitted by the radiating element.

The thickness of such an antenna is reduced compared to that of an antenna using other known technologies, in particular an absorbing cavity antenna. In addition, its manufacture is greatly simplified and reproducible.

However, the frequency band of such an antenna is restricted because of the relationship between the operating frequency of the antenna (i.e. the wavelength of the emitted wave) and the fixed distance between the radiating plane and the reflecting plane (which is defined by construction).

SUMMARY OF THE INVENTION

In response to this problem, the applicant has proposed, in application FR 3 003 702, two embodiments of an antenna comprising, interposed between the radiating plane and the reflecting plane, a substrate with a relative electrical permittivity which varies as a function of the distance from the axis of the antenna, here referred to as radius r. The fixed distance between the radiating plane and the reflecting plane is thus eliminated by changing the wavelength in the substrate as a function of the radius by adjusting the permittivity value. At a given frequency, only one ring of the antenna works properly, i.e. allows constructive interference forward of the emitting plane.

In the first embodiment, a permittivity gradient along the radius r is obtained by making vertical through-vias (empty or filled with a second dielectric material) in a disc made of a first dielectric material.

However, the creation of vias is tricky, especially in the centre of the antenna where their density must be high to reduce the relative electrical permittivity. The mechanical strength of the substrate is then greatly reduced. Furthermore, it is difficult to make vias with a diameter of less than $\lambda/10$, a dimension below which wave propagation in the substrate is not disturbed by the presence of these vias.

In the second embodiment, a permittivity gradient along the radius r is obtained by combining rings made of different dielectric materials, the side faces of the rings being bevelled to obtain a continuous permittivity gradient along the radius r.

However, regardless of the embodiment, a first problem has been identified. It is related to the generating of creeping waves on the surface of the reflecting plane. Once generated, a creeping wave can disrupt the reflection of the wave emitted backwards from the radiating element and therefore alter the constructive interference sought to be created with the wave emitted forward in front of the radiating plane.

This first problem is caused by the substrate material in the immediate vicinity of the reflecting plane, which has too high a local relative electrical permittivity. It should ideally be equal to or close to one.

A second problem was identified. It is related to the coupling between two successive strands of the radiating element. Since each strand is associated with a specific operating frequency, such coupling degrades the accuracy of the antenna.

This second problem is caused by the substrate material in the immediate vicinity of the radiating plane, which has too high a local relative electrical permittivity. It should ideally be equal to or close to one.

A third problem was identified. It lies in the disruption of the wave path as it passes through the substrate.

In the first embodiment, especially in the centre of the antenna associated with high frequencies and thus short wavelengths, it is not possible to create vias with a diameter of less than $\lambda/10$. The vias created therefore disturb the waves passing through the substrate by diffraction.

In the second embodiment, the interface between two successive rings constitutes a jump in local relative permittivity, i.e. an index step. This interface therefore disturbs the direction of wave propagation by refraction.

In both these cases, the reflected wave no longer allows for accurate constructive interference forward of the reflecting plane.

These various problems therefore alter the properties of the antenna, in particular its radiation pattern.

The purpose of this invention is to solve these problems.

The object of the invention is a wideband wire antenna comprising: a radiating element, the radiating element comprising at least one metal wire shaped around an axis of the antenna, in a transverse radiating plane; a reflecting plane, the reflecting plane being transverse to the axis, the radiating plane being located at a predetermined height (h0) above the reflecting plane; and a substrate, the substrate being interposed between the radiating element and the reflecting plane, and having a constant thickness, characterised in that a local relative electrical permittivity and/or a local relative electrical permeability of the substrate is a function of the radius, i.e. the distance from the axis, and a height, i.e. a distance to the reflecting plane, the local relative electrical permittivity being, at constant height, increasing as a function of the radius, and, at constant radius, increasing as a function of the height at least for a portion of the substrate in the vicinity of the reflecting plane.

According to particular embodiments, the antenna comprises one or more of the following features taken in isolation or in any combination that is technically possible:

- the local relative electrical permittivity and/or the local relative electrical permeability is, at constant radius, decreasing with height at least for a portion of the substrate in the vicinity of the radiating element.
- the local relative electrical permittivity and/or the local relative electrical permeability is, at constant radius, a cosine function of the height.
- the local relative electrical permittivity and/or the local relative electrical permeability is a continuous function of radius and height.
- the substrate results from the combination of at least a first material having a first relative electrical permittivity and/or a first relative electrical permeability, with a second material having a second relative electrical permittivity different from the first and/or a second relative electrical permeability different from the first, a relative concentration of the first and second materials being a function of the radius and height.
- the combination of the first and second materials is achieved by using an additive manufacturing technology, in particular three-dimensional printing.
- the first material has a plurality of first interstices, some of said first interstices being filled by the second material and/or the second material has a plurality of second interstices, some of said second interstices being filled by the first material.
- the first interstices and/or the second interstices have a characteristic dimension which depends on the radius and/or the height.
- the first interstices and/or the second interstices have a parallelepipedal or spherical shape, the largest dimension of an interstice preferably being less than $\lambda/10$.

BRIEF DESCRIPTION OF THE DRAWINGS

The invention and its advantages will be better understood upon reading the following description of a particular embodiment, given only as an example, and with reference to the attached drawings, in which.

DESCRIPTION OF THE PREFERRED EMBODIMENTS

The figures show a preferred embodiment of the antenna according to the invention.

Figure 1:
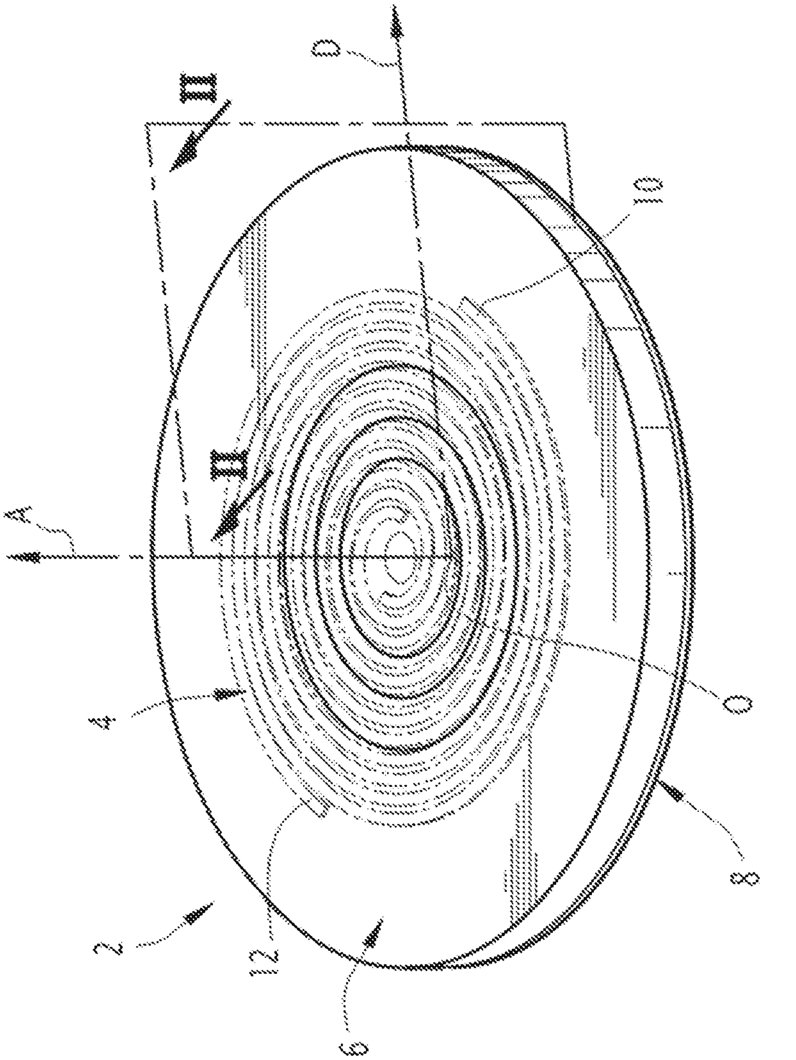
FIG. 1 is a schematic view of an antenna according to the invention.
Figure 2:
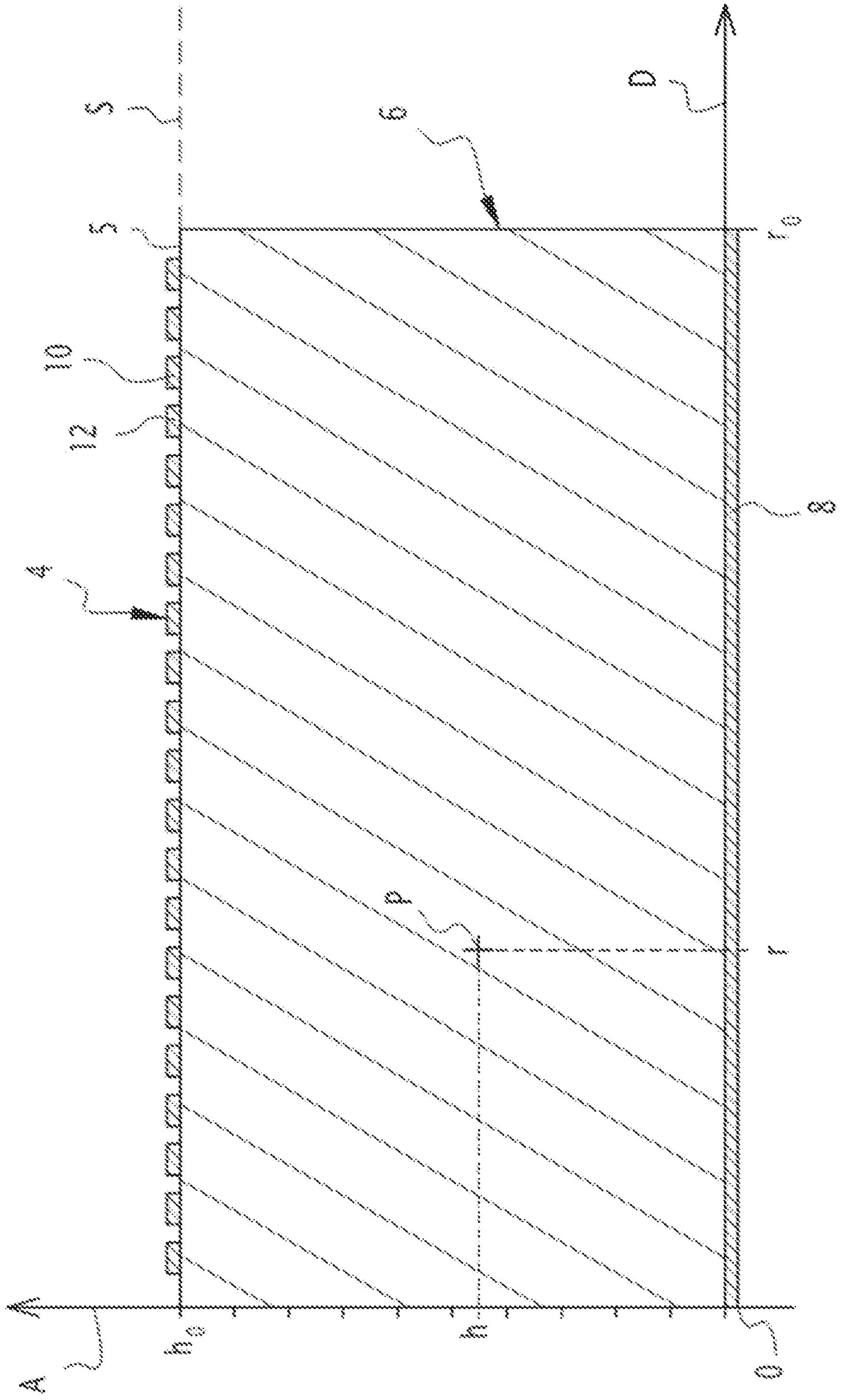
FIG. 2 is a half-section along an axial plane of the antenna of FIG. 1.

As shown in FIGS. 1 and 2, the wideband wire antenna 2 comprises, stacked along an axis A, a reflecting plane 8, a substrate 6 and a radiating element 4.

An origin O is chosen at the intersection of the axis A and the reflecting plane 8.

The coordinate along the axis A is called the height h. This is the distance to the reflecting plane 8.

A direction D is chosen extending radially to the axis A in the reflecting plane 8. The coordinate along the direction D is called the radius r. It is therefore the distance to the axis A.

The radiating element 4 is arranged in a radiating plane S, which is located at a height $h_0$ from the reflecting plane 8.

The radiating element 4 is, for example, made by etching a metal layer on a support film 5.

The radiating element 4 comprises, for example, first and second metal wires 10 and 12 which are respectively shaped into a spiral, in particular an Archimedean spiral, around the axis A.

The reflecting plane 8 is for example a disc with axis A and radius $r_0$. It is made of a metallic material. Its function is to reflect any incident wave regardless of its frequency.

The substrate 6 has the general external shape of a disc with axis A, radius $r_0$, and constant thickness, equal to height $h_0$.

The substrate 6 is in contact with the reflecting plane 8 via a lower surface 14. The substrate 6 is in contact with the radiating element 4, or more precisely with the support film 5 of the radiating element 4, via an upper surface 15.

A feeder (not shown in the figures) for the radiating element 4 is positioned below the reflecting plane 8. The reflecting plane 8 and the substrate 6 are advantageously provided with a passage (not shown), along the axis A, for the passage of the feed lines of the radiating element 4.

As the operating frequency F increases, the active zone Z of antenna 2 moves closer to the axis A. The peripheral part of antenna 2 therefore radiates at low operating frequencies and the central part of antenna 2 radiates at high operating frequencies.

According to the invention, the substrate 6 has a local relative electrical permittivity $\varepsilon_r$ at P(r,h) which is a function of both the radius r and the height h. It can therefore be written as: $\varepsilon_r(r,h)$.

Figure 3:
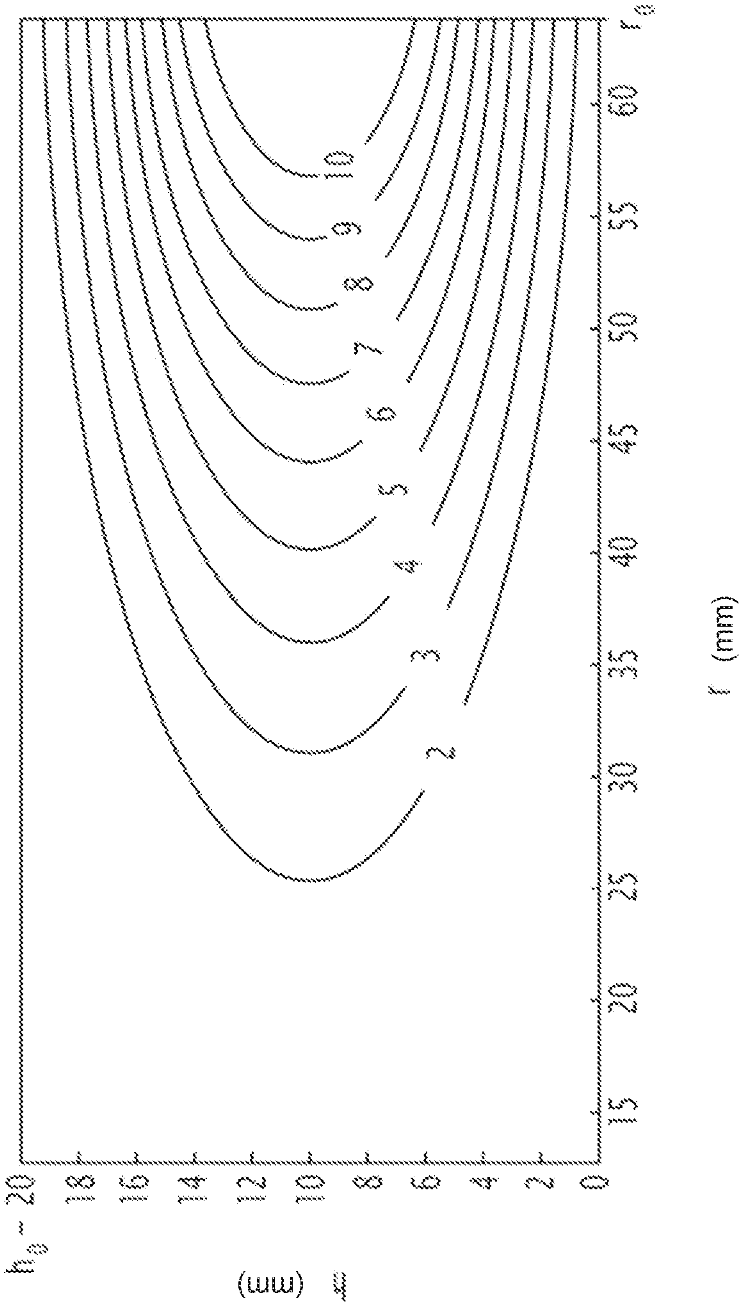
FIG. 3 is a plot of the local relative electrical permittivity in the antenna substrate of FIG. 1 as a function of radius r (distance to the axis A) and height h (distance to the reflecting plane)

FIG. 3 shows a possible example of this function. In FIG. 3, iso-permittivity curves have been plotted and the corresponding value of the local relative electrical permittivity $\varepsilon_r$ has been indicated.

The dependence of the permittivity $\varepsilon_r$ on h, for a given radius r, is such that for h close to 0, i.e. for points P(r,h) of the substrate in the immediate vicinity of the reflecting plane 8, the permittivity is minimal, preferably equal to one.

Thus, the material of the substrate 6 in contact with the reflecting plane 8 has a low permittivity so as to avoid the generating of creeping waves.

Advantageously, the dependence of the permittivity on h, for a given radius r, is such that for h close to $h_0$, i.e. for points P(r,h) of the substrate 6 in the immediate vicinity of the radiating plane 4, the permittivity is minimal, preferably equal to one.

Thus, the material of the substrate 6 in contact with the radiating element 4 has a low permittivity so as to avoid coupling between two consecutive strands of the radiating element 4.

Furthermore, irrespective of either or both of these behaviours at the lower and upper boundaries of the substrate 6, the dependence of the local relative permittivity $\varepsilon_r$ (r,h) is advantageously continuous on h and r.

Thus, the substrate material does not interfere with wave propagation through the substrate.

It should be noted that in the prior art, the relative electrical permittivity considered is an effective permittivity, obtained by integration over the height h, at a given radius r.

FIG. 3 shows, in grey scale, an example of a substrate whose permittivity $\varepsilon_r$ at a point P(r,h) depends on the radius r and the height h of that point.

The local relative electrical permittivity combines the three improvements identified above, namely a value close to one on the bottom surface 14, a value close to one on the top surface 15, and continuity at all points.

The local permittivity, for a given radius r, has a first minimum at zero height, then increases with height, reaching a maximum (e.g. at the middle of the substrate ($h_0/2$), then decreases with height h, reaching a second minimum at height $h_0$.

Preferably, the local relative electrical permittivity's dependence on h and r is of the general form:

$$\varepsilon_r(r,h) = \frac{\left[\left(\frac{\pi}{2}\frac{r}{h_0}\right)^2 - \varepsilon_{min}\right] * \frac{(n+1)}{h_0^n} * h^n}{y} + \varepsilon_{min}$$

where y is a parameter with a constant and predefined value, and n is a variable that can be an integer or a function depending on r and/or h In the embodiment shown in FIG. 3, the permittivity takes the particular form:

$$\varepsilon_r(r,h) = A(r)\cos\left(\frac{h - \frac{h_0}{2}}{\frac{h_0}{2}}\right) + \varepsilon_{min}$$

In this example, the local relative electrical permittivity $\varepsilon_r$ is a cosine function of the height h, at a given radius r.

The minimum value of this function is $\varepsilon_{min}$, which is preferably 1.

The value of the maximum of this function for a given height h depends on the radius r.

As in the prior art, the effective permittivity at a given radius r, i.e. the integral according to the variable h of the local relative electrical permittivity $\varepsilon_r$ (r,h) between 0 and $h_0$, is a function of the radius r adapted to allow the desired constructive interference, the principle on which this antenna technology is based.

Figure 4:
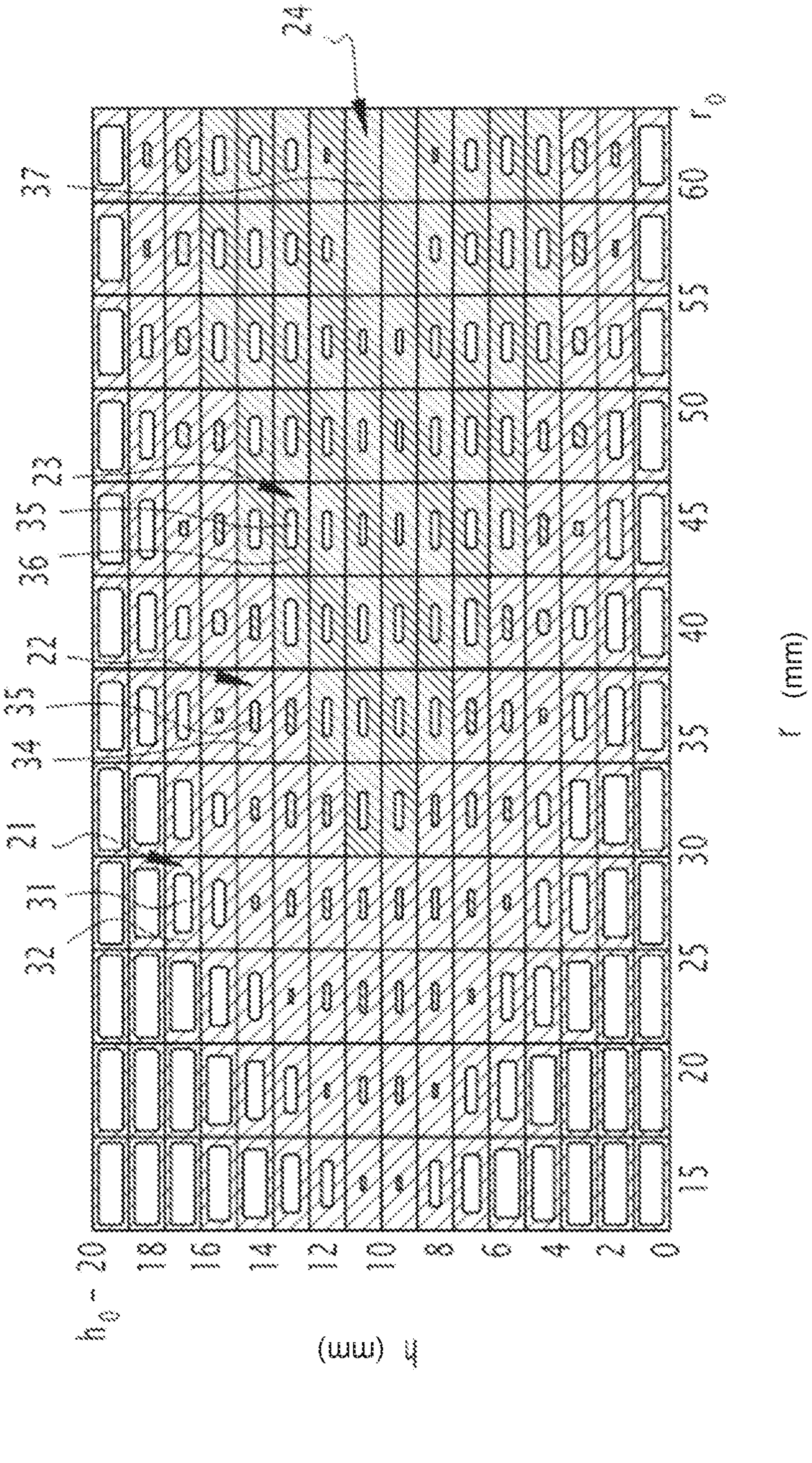
FIG. 4 illustrates a possible structure of the antenna substrate of FIG. 1 to achieve the local relative electrical permittivity distribution shown in FIG. 3; and, FIG. 5 is a plot of the gain versus frequency of an antenna according to the prior art and an antenna according to the invention.

As illustrated in FIG. 4, an additive manufacturing process, such as three-dimensional printing, is preferably used to produce the substrate 6.

The material of the substrate 6 is a combination of at least two materials, respectively a first material with a first low relative permittivity and a second material with a second high relative permittivity.

The relative concentration of the first and second materials at a point P(r,h) is a function of the coordinates h and r.

For instance, and preferably, the first material is deposited so as to have a plurality of first interstices, some of said first interstices being filled by the second material and/or the second material has a plurality of second interstices, some of said second interstices being filled by the first material.

For example, three-dimensional printing allows the substrate to be structured into cells.

To make the cell 21, the first material is deposited to form the walls 32 of the cell while leaving an interstice 31, which is left empty.

To make the cell 22, the first material is deposited to form the walls 34 of the cell, while leaving an interstice 33, which is then filled with the second material.

To make the cell 23, the second material is deposited to form the walls 36 of the cell, while leaving an interstice 35, which is then filled with the first material.

To make the cell 24, the second material is deposited to form the walls 37 of the cell, without leaving any interstices. The cell is full.

The thickness of the walls (and therefore the size of the interstices) is adjusted for each cell in order to obtain the required local relative electrical permittivity value, taking into account the properties of the materials used.

Advantageously, the first interstices and/or the second interstices have a characteristic dimension which depends on the distance to the axis and/or the distance to the radiating plane and/or to the reflecting plane.

The first interstices and/or the second interstices have a rectangular parallelepiped shape (as a first approximation). Alternatively, they have a spherical shape.

The largest dimension of an interstice is less than $\lambda/8$, preferably less than $\lambda/10$, more preferably less than $\lambda/15$.

Because of this honeycomb structure, the substrate has good mechanical strength.

Figure 5:
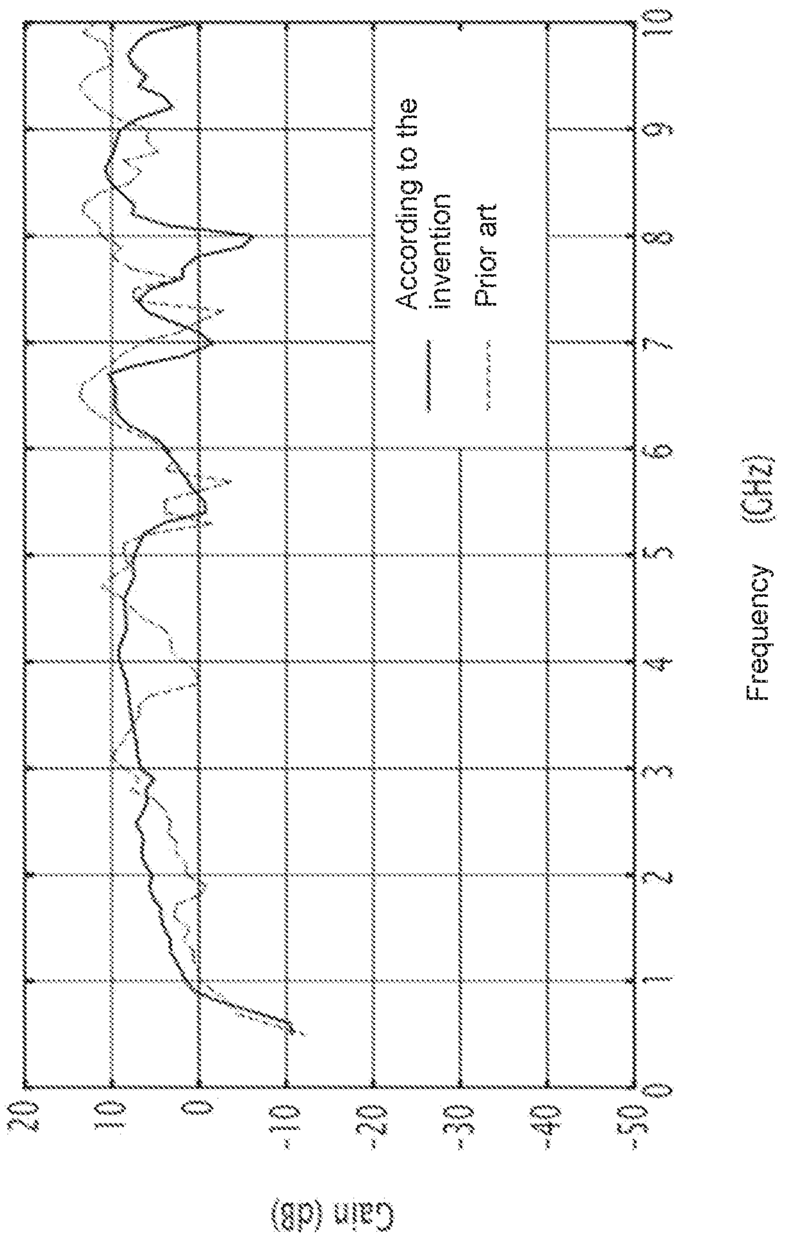

FIG. 5 is a plot showing the gain (in dB decibels) as a function of the operating frequency (in Hz hertz) of an antenna according to the prior art and of an antenna according to the invention. The gain is evaluated here along the axis of the antenna.

It can be seen, especially in the first half of the frequency spectrum, that the gain of the antenna according to the invention is much more stable in frequency with gain values often higher than those of an antenna according to the state of the art.

Alternatively, instead of characterizing the antenna by a local relative electrical permittivity as a function of r and h, it could be characterized by a local relative electrical permeability as a function of r and h.

The invention claimed is:

1. A wideband wire antenna comprising:

a radiating element, the radiating element comprising at least one metal wire shaped around an axis of the antenna, in a transverse radiating plane;

a reflecting plane, the reflecting plane being transverse to the axis, the radiating plane being located at a predetermined height above the reflecting plane; and, a substrate, the substrate being interposed between the radiating element and the reflecting plane, and having a constant thickness, wherein a local relative electrical permittivity and/or a local relative electrical permeability f the substrate is a function of the radius, measured as a distance to the axis, and a height, measured as a distance to the reflecting plane, the local relative electrical permittivity and/or a local relative electrical permeability being, at constant height, increasing as a function of the radius, and, at constant radius, increasing as a function of the height at least for a portion of the substrate in the vicinity of the reflecting plane.

2. The antenna according to claim 1, wherein the local relative electrical permittivity and/or the local relative electrical permeability is, at constant radius, decreasing with height at least for a portion of the substrate in the vicinity of the radiating element.

3. The antenna according to claim 2, wherein the local relative electrical permittivity and/or the local relative electrical permeability is, at constant radius, a cosine function of the height.

4. The antenna according to claim 1, wherein the local relative electrical permittivity and/or the local relative electrical permeability is a continuous function of the radius and the height.

5. The antenna according to claim 1, wherein the substrate results from the combination of at least a first material having a first relative electrical permittivity and/or a first relative electrical permeability, with a second material having a second relative electrical permittivity different from the first and/or a second relative electrical permeability different from the first, a relative concentration of the first and second materials being a function of the radius and height.

6. The antenna according to claim 5, wherein the combination of the first and second materials is achieved by using an additive manufacturing technology.

7. The antenna according to claim 5, wherein the first material has a plurality of first interstices, some of said first interstices being filled by the second material and/or the second material has a plurality of second interstices, some of said second interstices being filled by the first material.

8. The antenna according to claim 7, wherein the first interstices and/or the second interstices have a characteristic dimension which depends on the radius and/or on the height.

9. The antenna according to claim 7, wherein the first interstices and/or the second interstices have a parallelepipedal or spherical shape.

10. The antenna of claim 6, wherein the additive manufacturing technology is three-dimensional printing.

11. The antenna of claim 9, wherein the largest dimension of an interstice is less than $\lambda/10$.

12. The antenna according to claim 2, wherein the local relative electrical permittivity and/or the local relative electrical permeability is a continuous function of the radius and the height.

13. The antenna according to claim 3, wherein the local relative electrical permittivity and/or the local relative electrical permeability is a continuous function of the radius and the height.

14. The antenna according to claim 2, wherein the substrate results from the combination of at least a first material having a first relative electrical permittivity and/or a first relative electrical permeability, with a second material having a second relative electrical permittivity different from the first and/or a second relative electrical permeability different from the first, a relative concentration of the first and second materials being a function of the radius and height.

15. The antenna according to claim 3, wherein the substrate results from the combination of at least a first material having a first relative electrical permittivity and/or a first relative electrical permeability, with a second material having a second relative electrical permittivity different from the first and/or a second relative electrical permeability different from the first, a relative concentration of the first and second materials being a function of the radius and height.

16. The antenna according to claim 4, wherein the substrate results from the combination of at least a first material having a first relative electrical permittivity and/or a first relative electrical permeability, with a second material having a second relative electrical permittivity different from the first and/or a second relative electrical permeability different from the first, a relative concentration of the first and second materials being a function of the radius and height.

17. The antenna according to claim 6, wherein the first material has a plurality of first interstices, some of said first interstices being filled by the second material and/or the second material has a plurality of second interstices, some of said second interstices being filled by the first material.

18. The antenna according to claim 17, wherein the first interstices and/or the second interstices have a parallelepipedal or spherical shape.

19. The antenna according to claim 10, wherein the substrate results from the combination of at least a first material having a first relative electrical permittivity and/or a first relative electrical permeability, with a second material having a second relative electrical permittivity different from the first and/or a second relative electrical permeability different from the first, a relative concentration of the first and second materials being a function of the radius and height.

20. The antenna according to claim 11, wherein the substrate results from the combination of at least a first material having a first relative electrical permittivity and/or a first relative electrical permeability, with a second material having a second relative electrical permittivity different from the first and/or a second relative electrical permeability different from the first, a relative concentration of the first and second materials being a function of the radius and height.

* * * * *